(12) United States Patent
Brown et al.

(10) Patent No.: US 12,370,484 B2
(45) Date of Patent: Jul. 29, 2025

(54) POWDER BED FUSION APPARATUS AND METHODS

(71) Applicant: RENISHAW PLC, Wotton-Under-Edge (GB)

(72) Inventors: Ceri Brown, Plaisance-du-Touch (FR); Daniel John Curtis, Stone (GB)

(73) Assignee: RENISHAW PLC, Wotton-under-Edge (GB)

( * ) Notice: Subject to any disclaimer, the term of this patent is extended or adjusted under 35 U.S.C. 154(b) by 931 days.

(21) Appl. No.: 17/263,356

(22) PCT Filed: Sep. 10, 2019

(86) PCT No.: PCT/GB2019/052518
§ 371 (c)(1),
(2) Date: Jan. 26, 2021

(87) PCT Pub. No.: WO2020/053571
PCT Pub. Date: Mar. 19, 2020

(65) Prior Publication Data
US 2021/0308769 A1    Oct. 7, 2021

(30) Foreign Application Priority Data
Sep. 10, 2018   (EP) .................................... 18193425

(51) Int. Cl.
*B22F 12/70* (2021.01)
*B01D 46/00* (2022.01)
(Continued)

(52) U.S. Cl.
CPC ..... *B01D 46/4272* (2013.01); *B01D 46/2403* (2013.01); *B01D 46/446* (2013.01);
(Continued)

(58) Field of Classification Search
CPC .... B01D 46/4272; B01D 46/62; B01D 46/58; B01D 46/2403; B01D 46/446;
(Continued)

(56) References Cited

U.S. PATENT DOCUMENTS 10,933,620 B2   3/2021   Sutcliffe et al.
10,974,184 B2   4/2021   Scott et al.
(Continued)

FOREIGN PATENT DOCUMENTS

CN   102186554 A   9/2011
CN   104507601 A   4/2015
(Continued)

OTHER PUBLICATIONS

Oct. 8, 2019 Search Report issued in International Patent Application No. PCT/GB2019/052518.
(Continued)

*Primary Examiner* — Qianping He
(74) *Attorney, Agent, or Firm* — Oliff PLC

(57) ABSTRACT

A method of filtering gas in a powder bed fusion apparatus, wherein an object is built layer-by-layer by selective solidification of a powder bed, and a powder bed fusion apparatus for executing the method. The apparatus includes a build chamber housing the powder bed, a gas circuit for recirculating the gas, including passing the gas over the powder bed within the build chamber, multiple filter assemblies in the gas circuit for filtering process emissions from the recirculated gas and a valve system regulating gas flow to each filter assembly. The method may include controlling the valve system to divide the gas flow between the filter assemblies. The method includes controlling the valve system such that a first one of the filter assemblies is connected with at least one second one of the filter assemblies such that the gas passes through the filter elements of both filter assemblies.

18 Claims, 2 Drawing Sheets

(51) Int. Cl.

| | |
|---|---|
| *B01D 46/24* | (2006.01) |
| *B01D 46/42* | (2006.01) |
| *B01D 46/44* | (2006.01) |
| *B01D 46/58* | (2022.01) |
| *B01D 46/62* | (2022.01) |
| *B22F 10/28* | (2021.01) |
| *B22F 10/322* | (2021.01) |
| *B22F 10/77* | (2021.01) |
| *B23K 26/144* | (2014.01) |
| *B23K 26/342* | (2014.01) |
| *B33Y 10/00* | (2015.01) |
| *B33Y 30/00* | (2015.01) |
| *B33Y 40/00* | (2020.01) |
| *B22F 10/80* | (2021.01) |
| *B22F 12/90* | (2021.01) |
| *B33Y 50/00* | (2015.01) |

(52) U.S. Cl.
CPC ............ *B01D 46/58* (2022.01); *B01D 46/62* (2022.01); *B22F 10/28* (2021.01); *B22F 10/322* (2021.01); *B22F 10/77* (2021.01); *B22F 12/70* (2021.01); *B23K 26/144* (2015.10); *B23K 26/342* (2015.10); *B33Y 10/00* (2014.12); *B33Y 30/00* (2014.12); *B33Y 40/00* (2014.12); *B22F 10/80* (2021.01); *B22F 12/90* (2021.01); *B33Y 50/00* (2014.12)

(58) Field of Classification Search
CPC ........ B01D 46/00; B01D 46/44; B01D 46/24; B01D 46/42; B33Y 10/00; B33Y 40/00; B33Y 50/00; B33Y 30/00; B23K 26/342; B23K 26/144; B22F 10/77; B22F 12/70; B22F 10/28; B22F 12/90; B22F 10/80

USPC .............................................................. 96/22
See application file for complete search history.

(56) References Cited

U.S. PATENT DOCUMENTS

| | | | |
|---|---|---|---|
| 2015/0135897 | A1 | 5/2015 | Sutcliffe et al. |
| 2015/0367446 | A1* | 12/2015 | Buller ................ C04B 35/522 |
| | | | 219/74 |
| 2016/0001364 | A1 | 1/2016 | Mironets et al. |
| 2016/0059310 | A1* | 3/2016 | Junker ................ B01D 50/10 |
| | | | 419/53 |
| 2016/0193696 | A1 | 7/2016 | McFarland et al. |
| 2018/0126460 | A1* | 5/2018 | Murphree ............ B33Y 40/00 |
| 2018/0133637 | A1 | 5/2018 | Stammberger et al. |

FOREIGN PATENT DOCUMENTS

| | | |
|---|---|---|
| CN | 105382257 A | 3/2016 |
| CN | 105658356 A | 6/2016 |
| CN | 107107193 A | 8/2017 |
| WO | 2010/007394 A1 | 1/2010 |
| WO | 2010/007396 A1 | 1/2010 |
| WO | 2010/026396 A2 | 3/2010 |
| WO | 2016/079494 A2 | 5/2016 |

OTHER PUBLICATIONS

Oct. 8, 2019 Written Opinion of the International Searching Authority issued in International Patent Application No. PCT/GB2019/052518.

Mar. 14, 2019 Extended Search Report issued in European Patent Application No. 18193425.8.

\* cited by examiner

POWDER BED FUSION APPARATUS AND METHODS

FIELD OF INVENTION

This invention concerns powder bed fusion apparatus and methods in which selected areas of a powder bed are solidified in a layer-by-layer manner to form a workpiece. The invention has particular, but not exclusive application, to selective laser melting (SLM) and selective laser sintering (SLS) apparatus.

BACKGROUND

Powder bed fusion apparatus produce objects through layer-by-layer solidification of a material, such as a metal powder material, using a high-energy beam, such as a laser beam. A powder layer is formed across a powder bed contained in a build sleeve by lowering a build platform in the build sleeve to lower the powder bed, dosing a heap of powder adjacent to the lowered powder bed and spreading the heap of powder with a recoater across (from one side to another side of) the powder bed to form the layer. Portions of the powder layer corresponding to a cross-section of the workpiece to be formed are then solidified through irradiating these areas with the beam. The beam melts or sinters the powder to form a solidified layer. After selective solidification of a layer, the powder bed is lowered by a thickness of the newly solidified layer and a further layer of powder is spread over the surface and solidified, as required.

During SLM of material, in particular metals, the melt pool emits a hot, high-speed vapour plume that cools to form a fine mist of metal 'condensate' nano-particles. In addition, larger irregular spatter particles are ejected from the boiling melt pool. Furthermore, the pressure drop caused by the motion of the vapour plume draws in powder near the melt pool, casting it upwards away from the powder bed.

These process emissions should be removed from the build chamber to prevent undesirable effects, such as the gas-borne particles interfering with the passage of the laser beam to the powder bed. It is known to remove the processing emissions from the build chamber by introducing a gas flow through the chamber in which the condensate, spatter and other particles are entrained, the particles exiting the chamber along with the gas flow through an exhaust.

Gas collected by the exhaust is recirculated through a gas circuit back to the nozzle under the control of a pump. A filter in the gas circuit filters condensate from the recirculated gas.

WO2010/007394 discloses a filter arrangement comprising parallel filter assemblies, allowing a filter element in each filter assembly to be changed during operation of the apparatus whilst the other filter assembly is in service. Such a system may allow a manufacturing operation to be completed without interruption.

WO2016/079494 discloses a filter arrangement comprising parallel filter assemblies, wherein air is purged from each filter assembly before the filter assembly is connected in-line in the gas circuit leading to the build chamber. In this way, the changeover of the filter element during the manufacturing operation does not introduce oxygen and/or moisture into the build chamber, which could change the processing conditions in the build chamber.

US2018/0133637 discloses apparatus for additive manufacturing three-dimensional objects comprising a pipe structure which can be flown through by a process gas arising in the course of additive construction processes and filter modules arranged exchangeably connected to a pipe structure. The filter modules connected to the pipe structure can be switched separately, i.e., individually or in groups or collectively, via a switching device assigned to the filter device to a respective operating state in which the respective filter module is connected to the pipe structure such that it can be flown through by the process gas, and to a respective nonoperating state in which the respective filter module is connected to the pipe structure such that it cannot be flown through by the process gas. Respective switch positions of the switching device can be realized, for example, such that the process gas flows in a first exemplary switch position through only one single filter module and in a second exemplary switch position through at least two, possibly all, filter modules.

SUMMARY OF INVENTION

According to a first aspect of the invention there is provided a method of filtering gas in a powder bed fusion apparatus, in which an object is built layer-by-layer by selective solidification of a powder bed, the powder bed fusion apparatus comprising a build chamber for housing the powder bed, a gas circuit for recirculating the gas, including passing the gas over the powder bed within the build chamber, a plurality of filter assemblies in the gas circuit for filtering process emissions from gas recirculated through the gas circuit and a valve system operable to regulate a flow of the gas to each one of the filter assemblies.

The filter assemblies may be connected or connectable in parallel in the gas circuit. The method may comprise controlling the valve system to divide the gas flow between a first one of the filter assemblies housing an unused filter element and at least one second one of the filter assemblies housing a used filter element such that less gas flows through the first filter assembly than the or each second filter assembly. The gas flow through the first filter assembly may be less than half and, preferably, less than a quarter of that through the or each second filter assembly. This gas flow regime may be maintained for an initial time period after which the flow of the gas to the first and second filter assemblies is altered, for example by increasing the gas flow to the first filter assembly and/or reducing or stopping the gas flow to the second filter assembly. For example, the gas flow through the first filter assembly may be increased to be equal to or more than the gas flow, if any, through the or each second filter assembly.

The filter assemblies may be connectable such that ones of the filter assemblies are connected in series in the gas circuit. The method may comprise controlling the valve system such that a first one of the filter assemblies housing an unused filter element is connected in series in the gas circuit with at least one second one of the filter assemblies housing a used filter element such that the gas passes through the filter elements of both the first and second filter assemblies. The method may comprise controlling the valve system such that, after an initial time period, the gas flow through the at least one second filter assembly is reduced or stopped altogether.

It has been found that an unused filter element unpopulated with particles of the processing emissions fails to filter the processing emissions from the gas flow to a level low enough to avoid undesirable effects on radiation, such as laser beams, that passes though such filtered gas. It is believed that this is because the processing emissions collected on the filter elements themselves act to filter the processing emissions from the gas. Accordingly, a filtering efficiency of a filter element can be higher once it has become populated with processing emissions. The method mitigates or even eliminates adverse effects on the powder bed fusion process caused by a replacement of the filter element by exposing the unused filter element to processing emissions to populate the filter element with processing emissions whilst a partially used filter element in another filter assembly is used to keep processing emissions in the gas recirculated back to the build chamber sufficiently low. Once the filter element of the first filter assembly has been sufficiently populated with processing emissions, the gas flow to the filter assemblies can be altered, for example such that the first filter assembly is used alone.

The initial time period may be a period during which powder is solidified using the powder bed fusion apparatus and process emissions are carried away by the gas flow. The initial time period may include a period in which one or more layers of a build, such as two, three or four layers, are completed. In this way, process emissions generated by the solidification of the powder can be used to populate the unused filter element.

The filter element of each filter assembly may comprise a mesh type filter element, such as a paper filter element.

A method may comprise a blended switchover between the at least one second filter assembly and the first filter assembly, with the gas flow to the first filter assembly progressively increasing and the gas flow to the or each second filter assembly progressively decreasing, for example in steps or in a continuous change. The apparatus may comprise a detector for detecting a characteristic of the gas flow through the gas circuit and the method may comprise operating the valve system to switchover the gas flow to the first filter assembly from the at least one second filter assembly when the characteristic of the gas flow is detected to be at a predetermined level. For example, the detected characteristic may be a pressure differential across one or more of the filter assemblies, or a pump state required to maintain a constant flow rate, for example as measured by a mass flow rate sensor, through the gas circuit.

The method may comprise controlling the valve system to direct the gas flow to a first one of the filter assemblies during a first period of a build of an object resulting in a first partially used filter element, switch the valve system to direct the gas flow to a second one of the filter assemblies during a second period (different to the first period) of the build resulting in a second partially used filter element and switch the valve system to divide the gas flow between the first filter assembly housing the first partially used filter element and a second filter assembly housing the second partially used filter element during a third period (different to the first and second periods) of the build. When a partially used filter element has become sufficiently blocked such that a required performance is no longer achievable using the first filter element alone, it may still provide a satisfactory performance when used in combination with another partially used filter element. Accordingly, switching valve system to divide the gas flow between the first filter assembly housing the first partially used filter element and a second filter assembly housing the second partially used filter element during a third period may extend the useful life of the filter elements.

The method may comprise switching the gas flow when a detected value exceeds a threshold. The detected value may be a pressure differential across the filter assemblies and/or a measurement of gas flow velocity through the gas circuit.

The switchover between the first filter assembly and the second filter assembly may be a blended switchover as described above.

According to a second aspect of the invention there is provided a controller for controlling a powder bed fusion apparatus, in which an object is built layer-by-layer by selective solidification of a powder bed, the powder bed fusion apparatus comprising a build chamber for housing the powder bed, a gas circuit for recirculating gas, including passing the gas over the powder bed within the build chamber, a plurality of filter assemblies in the gas circuit for filtering processing emissions from gas recirculated through the gas circuit and a valve system operable to regulate a gas flow to each one of the filter assemblies, the controller comprising a processor arranged to carry out the method of the first aspect of the invention.

According to a third aspect of the invention there is provided in a powder bed fusion apparatus, in which an object is built layer-by-layer by selective solidification of a powder bed, the powder bed fusion apparatus comprising a build chamber for housing the powder bed, a gas circuit for recirculating gas, including passing the gas over the powder bed within the build chamber, a plurality of filter assemblies in the gas circuit for filtering processing emissions from gas recirculated through the gas circuit, a valve system operable to regulate a gas flow to each one of the filter assemblies and a controller for controlling the valve system according to the second aspect of the invention.

The valve system may be capable of regulating a proportion of the gas flow flowing to each one of the filter assemblies. The valve system may comprise at least one valve, and preferably a valve for each filter assembly, capable of being maintained in a plurality of positions, wherein in each position the valve provides a different sized opening for gas flow to at least one of the filter assemblies.

According to a fourth aspect of the invention there is provided a data carrier having instructions thereon, which, when executed by a processor of a controller for controlling a powder bed fusion apparatus cause the controller to carry out the method of the first aspect of the invention.

DESCRIPTION OF THE DRAWINGS

Embodiments of the invention will now be described, by example only, with reference to the following drawings, in which.

DESCRIPTION OF EMBODIMENTS

Figure 1:
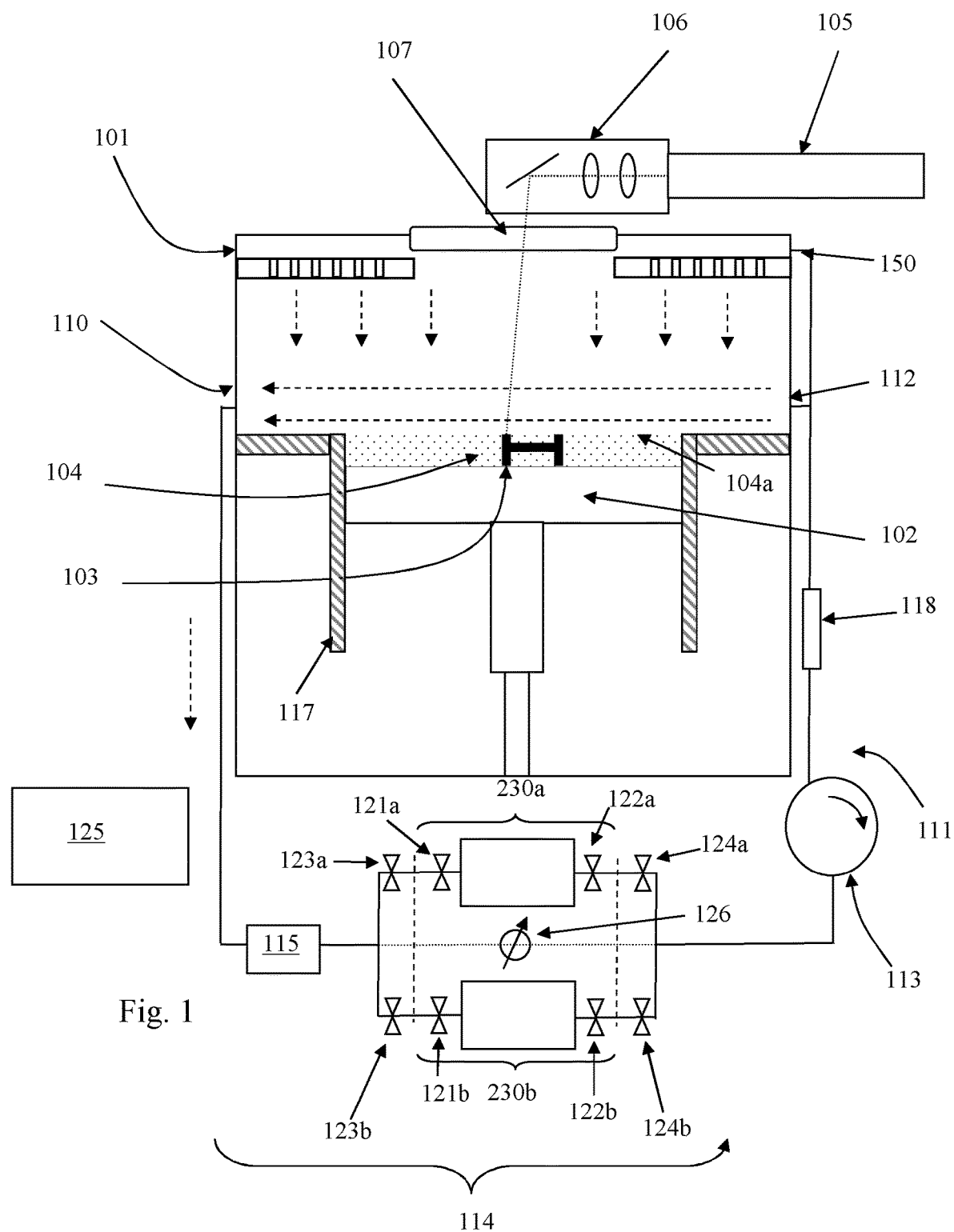
FIG. 1 is a schematic of a powder bed fusion apparatus according to an embodiment of the invention.
Figure 2:
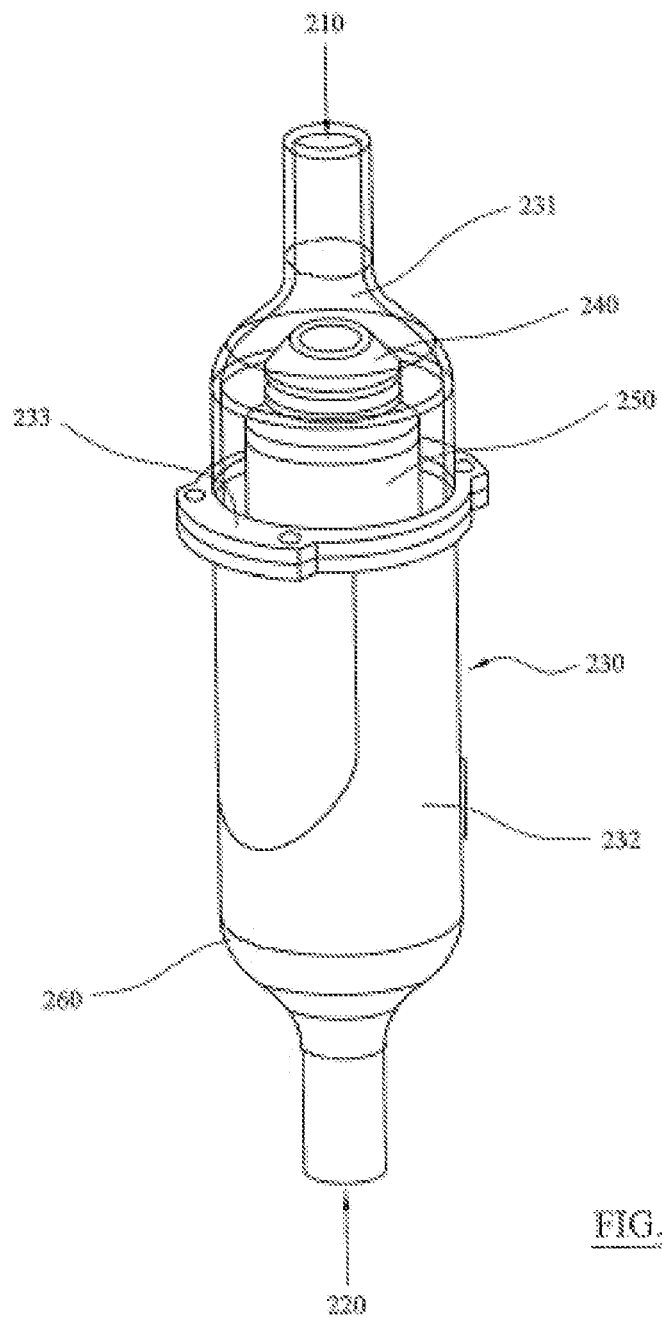
FIG. 2 is a perspective view of a filter assembly of the powder bed fusion apparatus shown in FIG. 1.

Referring to FIGS. 1 and 2, a powder bed fusion apparatus according to an embodiment of the invention comprises a build chamber 101 sealable from the external environment for maintaining a controlled atmosphere at a working surface 104a of a powder bed 104. Contained within the build chamber 101 is a build platform 102 for supporting the powder bed 104 and an object 103 built by selective laser melting powder of the powder bed 104. The platform 102 is lowerable in a sleeve 117 as successive layers of the object 103 are formed. Layers of powder 104 are formed as the object 103 is built by a powder dispensing apparatus and a wiper (not shown). For example, the powder dispensing apparatus may be apparatus as described in WO2010/007396. A laser module 105 generates a laser for melting the powder 104, the laser directed as required by a scanner in the form of optical module 106. The laser enters the build chamber via a window 107.

A gas circuit is provided for generating a gas flow across the powder bed formed on the build platform 102. The gas circuit comprises a gas nozzle 112 and gas exhaust 110 arranged either side of the build sleeve 117 for generating a gas knife across the powder bed 104. The gas nozzle 112 and gas exhaust 110 are arranged to produce a laminar gas knife local to the working surface 104a of the powder bed 104. It will be understood that more than one gas inlet 112 may be provided in the build chamber 101. In this embodiment, an array of apertures 150 are provided in a roof of the build chamber 101 to provide a steady downwards flow of gas away from the window 107. The process emissions generated by the laser melting process are carried away by the gas flow to the exhaust 110.

The gas circuit is completed by a gas recirculation loop 111, which re-circulates the gas from the gas exhaust 110 to the gas nozzle 112. The gas recirculation loop 111 comprises a pump 113 for driving the gas around the gas circuit and a filter system 114, upstream of the pump 113, for filtering particles from the gas flow. In this embodiment, the filter system comprises a cyclone separator 115, which separates larger particles of the process emissions from smaller "condensate" particles, and a pair of filter assemblies 230a, 230b arranged in a parallel relationship in the gas circuit. The cyclone separator 115 is located upstream of the filter assemblies 230a, 230b such that the larger particles of the process emissions are removed from the gas flow before the gas flow reaches the filter assemblies 230.

Downstream of the pump is a cooling device 118 for cooling the gas before it re-enters into the build chamber 101.

Referring to FIG. 2, each filter assembly 230a, 230b comprises a filter housing 260 having a gas inlet 210 and a gas outlet 220 and a filter element 250 located within the filter housing 260 either side of the gas inlet 210 and gas outlet 220. The filter housing 260 is formed from separable upper 231 and lower 232 portions. The upper portion is illustrated as transparent in FIG. 2 in order to clearly show the filter element 250 and deflector 240 inside. The housing is substantially cylindrical and the upper portion 231 and the lower portion 232 are securely clamped, when in use, at clamping rim 233. The clamping rim incorporates screws for affecting clamping of the two portions and an O-ring for sealing the housing when assembled.

The flow deflector 240 is incorporated in the upper portion 231 of the filter housing. The flow deflector 240 presses down on the end of and directs gas flow to the sides of a cylindrical filter element 250. The filter element 250 is located by a spigot surrounding the gas outlet in the lower portion 232 of the housing and securely clamped in place by pressure exerted from the flow deflector 240 of the upper portion 231 when the housing is assembled.

Referring back to FIG. 1, each filter assembly 230a; 230b further comprises valves 121a, 122a; 121b, 122b for sealing the gas inlet 210 and gas outlet 220 to gas flow and allowing the filter assembly to be removed from the gas circuit in a sealed condition. The dotted lines indicate where the filter assemblies 230a, 230b can be detached from the gas circuit. In this way, the filter element 250 can be replaced. Replacement of the filter element 250 may be carried out in the manner described in WO2010/026396 A2.

The gas circuit comprises a valve system for regulating the gas flow to each of the filter assemblies 230a, 230b. The valve system comprises valves 123a, 124a, 123b, 124b under the control of controller 125. The valves 123a, 124a; 123b, 124b are operable to shut-off the gas flow when the corresponding filter assembly 230a, 230b is not in use, for example when it is detached from the gas circuit, and regulate an amount of gas flow to the corresponding filter assembly 230a, 230b. The valves 123a, 123b can be set to a plurality of partially opened positions to regulate an amount of gas flow to the corresponding filter assembly 230a, 230b and can be opened at the same time such that gas flows simultaneously through both filter assemblies 230a, 230b. Sensor 226 is provided for measuring the gas pressure differential across the filter system 114.

The controller 115 operates the valves 123a, 124a; 123b, 124b as described hereinafter.

During a build of an object in the powder bed fusion apparatus, the valves 123a, 124a; 123b, 124b to one of the filter assemblies 230a, 230b are open whilst the valves 123b, 124b; 123a, 124a to the other filter assembly 230b, 230a are closed such that the gas flows through only one of the filter assemblies 230a, 230b. During the build, particles are filtered from the gas flow by the filter element 250 of the filter assembly 230a, 230b open to the gas flow and build up on a surface of the filter element 250. After a period of time, the filter element 250 can start to become blocked by the particles that have built up thereon. When the differential pressure across the filter assembly 230a, 230b as detected by sensor 226 exceeds a threshold (or when the pump 113 is no longer able to maintain the required gas flow rate through the filter assembly 230a, 230b/build chamber 101), a switchover of the filter assemblies 230a, 230b is initiated.

The switchover comprises progressively closing the valves 123a, 124a; 123b, 124b to the filter assembly 230b, 230a comprising a (partially) used filter element 250 whilst simultaneously progressively opening the valves 123b, 124b; 123a, 124a to the filter assembly 230b, 230a comprising the unused filter element 250. In this embodiment, the valves 123a, 124a; 123b, 124b are closed and opened in 10 steps of 9 degrees.

Accordingly, during the switchover, initially most of the gas flows through the used filter element 250 with only a relatively small proportion flowing through the unused filter element 250. In this way, the gas that flows through the new filter element 250 that may not be sufficiently filtered of process emissions by the new filter element is diluted by the larger volume of gas flowing through the used filter element 250 (which is sufficiently filtered). Due to this dilution a density of particles that are carried back through the build chamber 101 during a switchover is insufficient to have a detrimental effect on the build. Furthermore, it is believed that the lower gas velocity through the unused filter element 250 compared to the gas velocity when the corresponding valves 123a, 124a; 123b, 124b are fully open helps the filtration of particles from the gas flow further reducing an amount of particles that make it through the filter assemblies 230a, 230b compared to a non-blended switchover.

The time period for the blended switchover is based upon a cumulative laser firing time. This time period can be user set. However, it will typically be set to a value that is greater than a laser firing time for a single layer. For example, the cumulative laser firing time for the blended switchover may be more than 5, 10, 20, 30, 40, 50 or 60 seconds.

By using the blended switch-over, the unused filter element 250 is "preconditioned" by being coated with particles from the gas flow before the (now partially used) filter element 250 is exposed to the full/higher gas flow at the end of the blended switchover. This ensures that the particles required for satisfactory filtering of the gas flow are present when the filter element 250 is exposed to the full/higher gas flow.

Once full switchover between the filter assemblies 230a, 230b has been completed, the filter assembly 230a, 230b containing the "fully" used filter element 250 can be removed and the filter element 250 replaced using the process described in WO2010/007394.

The controller 115 may also operate the valves 123a, 124a; 123b, 124b to extend a useful life of a filter element 250. If no new filter element 250 is available for use (because a used filter element 250 has not been replaced), when the differential pressure across the filter assembly 230a, 230b as detected by sensor 226 exceeds a threshold, the controller 115 operates the valves 123a, 124a; 123b, 124b to fully open both filter assemblies 230a, 230b to the gas flow. The valves 123a, 124a; 123b, 124b may be switched to such a condition at maximum speed rather than the progressive switching which occurs for the blended switchover as no preconditioning is required. By opening both filter assemblies 230a, 230b to the gas flow, the flow velocity to the filter assemblies is halved, greatly reducing the differential pressure (by nearly a quarter) if both filters are dirty and near the end of life. This provides an alternative procedure to stopping the build when no more clean filter elements 250 are available and allows the build to continue until a point when the gas flow through both filter assemblies 230a, 230b in parallel exceeds the differential pressure threshold. This operation of the valve system may extend the useful life of the filter elements 250 sufficiently to complete a build such that replacement of the filter elements 250 during the build is not required. Non-ideal atmospheric conditions in the build chamber 101 at the start of a build when using one or more unused filter elements 250 may be acceptable as the start of the build may comprise the building of non-critical structures, such as supports, for which non-ideal melting conditions are acceptable. Accordingly, unused filter element(s) 250 present at the start of a build may have time to become preconditioned before the critical structures are built.

It will be understood that alterations and modifications may be made to the embodiments described above without departing from the invention as defined herein. For example, more than two filter assemblies may be used. The filter assemblies may be connectable in series as well as in parallel. The time period for a blended switchover may be based on a number of layers to be processed or a measurement of an amount of particles on the filter element rather than cumulative laser firing time.

The invention claimed is:

1. A method of filtering gas in a powder bed fusion apparatus, in which an object is built layer-by-layer by selective solidification of a powder bed,
the powder bed fusion apparatus comprising:
a build chamber for housing the powder bed;
a laser for generating a laser beam to melt powder of the powder bed;
a gas circuit for recirculating the gas, including passing the gas over the powder bed within the build chamber;
filter assemblies in the gas circuit for filtering process emissions from the gas recirculated through the gas circuit, the filter assemblies being connected or connectable in parallel in the gas circuit and comprising a first filter assembly, which houses an unused filter element, and at least one second filter assembly housing a used filter element; and
a valve system comprising a plurality of valves operable to regulate a flow of the gas to each one of the filter assemblies,
the method comprising:
during an initial time period, controlling the valve system to maintain a valve of the plurality of valves corresponding to the first filter assembly in at least one partially open position for the initial time period so as to divide the gas flow such that the gas flows simultaneously through the first filter assembly and the at least one second filter assembly and such that less of the gas flows through the first filter assembly than the at least one second filter assembly throughout the initial time period, the initial time period including a building period in which one or more layers of the object are completed by firing the laser beam to melt the powder of the powder bed, resultant process emissions being carried away to the first and second filter assemblies by the gas flow; and
after the initial time period, controlling the valve system to further open the valve corresponding to the first filter assembly so as to increase a proportion of the gas that flows to the first filter assembly.

2. The method according to claim 1, comprising a blended switchover between the at least one second filter assembly and the first filter assembly, with the gas flow through the first filter assembly being progressively increased and the gas flow through the at least one second filter assembly being progressively decreased.

3. The method according to claim 1, wherein during the building period two or more layers of the object are completed by firing the laser beam to melt the powder of the powder bed.

4. The method according to claim 1, wherein a length of the initial time period is set based on a cumulative firing time of the laser.

5. The method according to claim 1, comprising, during the initial time period, coating the unused filter element in the resultant process emissions to precondition the unused filter element before a higher gas flow is delivered to the first filter assembly after the initial time period.

6. The method according to claim 1, comprising switching over between the at least one second filter assembly and the first filter assembly, with the gas flow through the first filter assembly being progressively increased in steps and the gas flow through the at least one second filter assembly being progressively decreased in steps.

7. The method according to claim 6,
wherein the valve system is capable of regulating a proportion of the gas flow flowing to each one of the filter assemblies, the plurality of valves of the valve system each being capable of being maintained in a plurality of positions,
wherein in each of the plurality of positions each of the plurality of valves provides a different sized opening for gas flow to a corresponding one of the filter assemblies, and wherein controlling the valve system comprises stepping the valve corresponding to the first filter assembly through the plurality of positions to progressively increase the gas flow through the first filter assembly and progressively decrease the gas flow through the at least one second filter assembly.

8. The method according to claim 1, wherein maintaining the valve corresponding to the first filter assembly in at least one partially open position for the initial time period comprises a continuous change in an opening of the valve.

9. A controller for controlling a powder bed fusion apparatus, in which an object is built layer-by-layer by selective solidification of a powder bed, the powder bed fusion apparatus comprising:
a build chamber for housing the powder bed;
a laser for generating a laser beam to melt powder of the powder bed;
a gas circuit for recirculating gas, including passing the gas over the powder bed within the build chamber;
filter assemblies in the gas circuit for filtering process emissions from the gas recirculated through the gas circuit, the filter assemblies comprising a first filter assembly, which houses an unused filter element, and at least one second filter assembly housing a used filter element; and
a valve system comprising a plurality of valves operable to regulate a flow of the gas to each one of the filter assemblies, the controller comprising a processor programmed to:
during an initial time period, control the valve system to maintain a valve of the plurality of valves corresponding to the first filter assembly in at least one partially open position for the initial time period so as to divide the gas flow such that the gas flows simultaneously through the first filter assembly and the at least one second filter assembly and such that less of the gas flows through the first filter assembly than the at least one second filter assembly throughout the initial time period, the initial time period including a building period in which one or more layers of the object are completed by firing the laser beam to melt the powder of the powder bed, resultant process emissions being carried away to the first and second filter assemblies by the gas flow; and
after the initial time period, control the valve system to further open the valve corresponding to the first filter assembly so as to increase a proportion of the gas that flows to the first filter assembly.

10. The controller according to claim 9, wherein maintaining the valve corresponding to the first filter assembly in at least one partially open position for the initial time period comprises a continuous change in an opening of the valve.

11. A powder bed fusion apparatus, in which an object is built layer-by-layer by selective solidification of a powder bed, the powder bed fusion apparatus comprising:
a build chamber for housing the powder bed;
a laser for generating a laser beam to melt powder of the powder bed;
a gas circuit for recirculating gas, including passing the gas over the powder bed within the build chamber;
filter assemblies in the gas circuit for filtering process emissions from the gas recirculated through the gas circuit, the filter assemblies comprising a first filter assembly, which houses an unused filter element, and at least one second filter assembly housing a used filter element;
a valve system comprising a plurality of valves operable to regulate a flow of the gas to each one of the filter assemblies; and
a controller configured to:
during an initial time period, control the valve system to maintain a valve of the plurality of valves corresponding to the first filter assembly in at least one partially open position for the initial time period so as to divide the gas flow such that the gas flows simultaneously through the first filter assembly and the at least one second filter assembly and such that less of the gas flows through the first filter assembly than the at least one second filter assembly throughout the initial time period, the initial time period including a building period in which one or more layers of the object are completed by firing the laser beam to melt the powder of the powder bed, resultant process emissions being carried away to the first and second filter assemblies by the gas flow; and
after the initial time period, control the valve system to further open the valve corresponding to the first filter assembly so as to increase a proportion of the gas that flows to the first filter assembly.

12. The powder bed fusion apparatus according to claim 11,
wherein the valve system is capable of regulating a proportion of the gas flow flowing to each one of the filter assemblies, the plurality of valves of the valve system each being capable of being maintained in a plurality of positions,
and wherein in each position of the plurality of positions each of the plurality of valves provides a different sized opening for gas flow to a corresponding one of the filter assemblies.

13. The powder bed fusion apparatus according to claim 11, wherein a length of the initial time period is set based on a cumulative firing time of the laser.

14. The powder bed fusion apparatus according to claim 11, wherein the controller is configured to control the valve system to carry out a switchover between the at least one second filter assembly and the first filter assembly, with the gas flow through the first filter assembly being progressively increased in steps and the gas flow through the at least one second filter assembly being progressively decreased in steps.

15. The powder bed fusion apparatus according to claim 11, wherein the controller is configured to control the valve system to carry out a blended switchover between the at least one second filter assembly and the first filter assembly, with the gas flow through the first filter assembly being progressively increased and the gas flow through the at least one second filter assembly being progressively decreased.

16. The powder bed fusion apparatus according to claim 11, wherein the controller is configured to control the valve system to, during the initial time period, deliver the resultant process emissions to the first filter assembly to coat the unused filter element to precondition the unused filter element before a higher gas flow is delivered to the first filter assembly after the initial time period.

17. The powder bed fusion apparatus according to claim 11, wherein maintaining the valve corresponding to the first filter assembly in at least one partially open position for the initial time period comprises a continuous change in an opening of the valve.

18. A method of filtering gas in a powder bed fusion apparatus, in which an object is built layer-by-layer by selective solidification of a powder bed,
the powder bed fusion apparatus comprising:
a build chamber for housing the powder bed;
a laser for generating a laser beam to melt powder of the powder bed;
a gas circuit for recirculating the gas, including passing the gas over the powder bed within the build chamber;
filter assemblies in the gas circuit for filtering process emissions from the gas recirculated through the gas circuit, the filter assemblies being connected or connectable in parallel in the gas circuit; and a valve system operable to regulate a flow of the gas to each one of the filter assemblies, the method comprising:

controlling the valve system to carry out a blended switchover between a first filter assembly and a second filter assembly, the first filter assembly housing a first filter element having a different filtering efficiency to a second filter element housed in the second filter assembly, in which the gas flow is divided to flow simultaneously through the first and second filter assemblies and the gas flow through the first filter assembly is progressively increased and the gas flow through the second filter assembly is progressively decreased, the blended switchover occurring during a building period in which one or more layers of the object are completed by firing the laser beam to melt the powder of the powder bed, resultant process emissions being carried away to the first and second filter assemblies by the gas flow.

* * * * *